(12) United States Patent
Larsson

(10) Patent No.: US 11,708,862 B2
(45) Date of Patent: Jul. 25, 2023

(54) CLUTCH ARRANGEMENT FOR A ROADABLE AIRCRAFT

(71) Applicant: Ningbo Geely Automobile Research & Development Co., Ltd., Ningbo (CN)

(72) Inventor: Johannes Larsson, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 402 days.

(21) Appl. No.: 17/013,739

(22) Filed: Sep. 7, 2020

(65) Prior Publication Data

US 2020/0400198 A1 Dec. 24, 2020

Related U.S. Application Data

(63) Continuation of application No. PCT/CN2019/074980, filed on Feb. 13, 2019.

(30) Foreign Application Priority Data

Mar. 12, 2018 (EP) ..................................... 18161253

(51) Int. Cl.
*F16D 11/14* (2006.01)
*B60F 5/02* (2006.01)
(Continued)

(52) U.S. Cl.
CPC ................ *F16D 11/14* (2013.01); *B60F 5/02* (2013.01); *B60K 6/387* (2013.01); *B60K 6/46* (2013.01);
(Continued)

(58) Field of Classification Search
CPC ............... F16D 11/14; F16D 2011/002; F16D 2011/006; F16D 2011/004; F16D 2011/008; F16D 2023/123; B60F 5/02
See application file for complete search history.

(56) References Cited

U.S. PATENT DOCUMENTS 4,881,701 A 11/1989 Bullard
4,899,954 A * 2/1990 Pruszenski, Jr. .......... B60F 5/00
244/50
(Continued)

FOREIGN PATENT DOCUMENTS

CN 201863663 U 6/2011
CN 104118320 A 10/2014
(Continued)

OTHER PUBLICATIONS

International Search Report and Written Opinion from corresponding International Application No. PCT/CN2019/074980, dated Mar. 28, 2019, 9 pages.

*Primary Examiner* — Stacey A Fluhart
(74) *Attorney, Agent, or Firm* — Tucker Ellis LLP

(57) ABSTRACT

A clutch arrangement for between an engine and a propeller of a drivetrain of a roadable aircraft. The arrangement includes an engine shaft, a propeller shaft, a stationary clutch arrangement housing, and an engagement member which is rotationally locked to and axially slidable relative to propeller shaft. The engagement member includes a first engagement structure for engaging a corresponding engagement structure associated with the engine shaft for setting the clutch arrangement in a propeller propulsion mode, in which rotational propulsion torque is transmitted from the engine shaft to the propeller shaft via the engagement member. The engagement member further includes a second engagement structure for engaging a corresponding engagement structure associated with the clutch arrangement housing for setting the clutch arrangement in a propeller locked mode, in which the propeller shaft is rotationally locked to the clutch arrangement housing by means of the engagement member.

14 Claims, 9 Drawing Sheets

(51) Int. Cl.
  *B60K 6/387*      (2007.10)
  *B60K 6/46*       (2007.10)
  *B64C 37/00*      (2006.01)
  *B64D 35/02*      (2006.01)
  *F16D 11/10*      (2006.01)
  *F16D 23/02*      (2006.01)
  *F16D 23/14*      (2006.01)
  *F16D 11/00*      (2006.01)
  *F16D 23/12*      (2006.01)
  *F16D 121/14*     (2012.01)
  *F16D 121/24*     (2012.01)
  *F16D 125/40*     (2012.01)
  *F16D 125/50*     (2012.01)

(52) U.S. Cl.
  CPC .............. *B64C 37/00* (2013.01); *B64D 35/02* (2013.01); *F16D 11/10* (2013.01); *F16D 23/02* (2013.01); *F16D 23/14* (2013.01); *B60Y 2200/92* (2013.01); *F16D 2011/002* (2013.01); *F16D 2011/006* (2013.01); *F16D 2023/123* (2013.01); *F16D 2023/141* (2013.01); *F16D 2121/14* (2013.01); *F16D 2121/24* (2013.01); *F16D 2125/40* (2013.01); *F16D 2125/50* (2013.01)

(56) References Cited

U.S. PATENT DOCUMENTS

| | | | |
|---|---|---|---|
| 5,435,502 A * | 7/1995 | Wernicke | B64C 39/10 |
| | | | 244/45 R |
| 5,535,713 A | 7/1996 | Braddock | |
| 5,836,541 A | 11/1998 | Pham | |
| 2009/0215334 A1 | 8/2009 | Suzuki et al. | |
| 2015/0107955 A1* | 4/2015 | Tronnberg | F16D 11/10 |
| | | | 192/69.8 |
| 2019/0128417 A1* | 5/2019 | Schulte | F16D 11/14 |
| 2019/0351751 A1* | 11/2019 | Sato | F16D 21/04 |
| 2021/0188429 A1* | 6/2021 | Trinh | F16D 23/14 |

FOREIGN PATENT DOCUMENTS

| | | | |
|---|---|---|---|
| CN | 114248590 A | * | 3/2022 |
| DE | 102014204564 A1 | | 9/2015 |
| KR | 200479233 Y1 | * | 1/2016 |

* cited by examiner

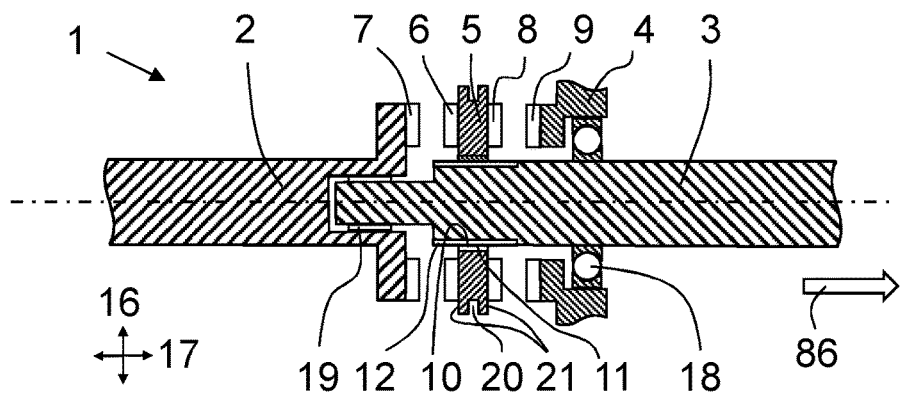
FIG.1A
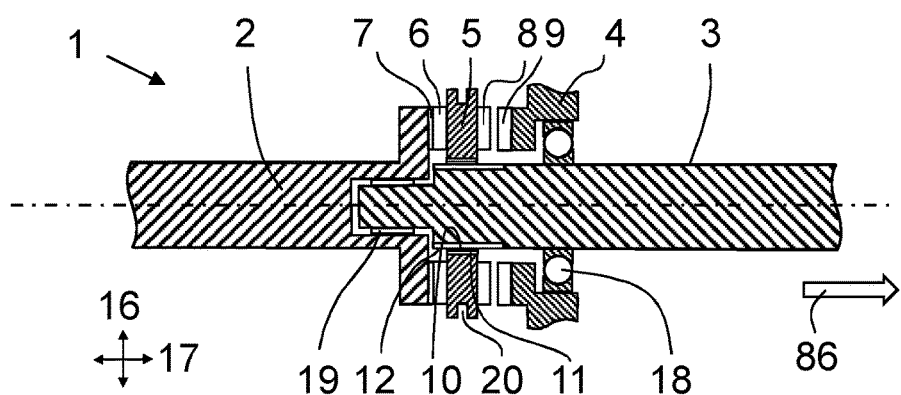
FIG.1B
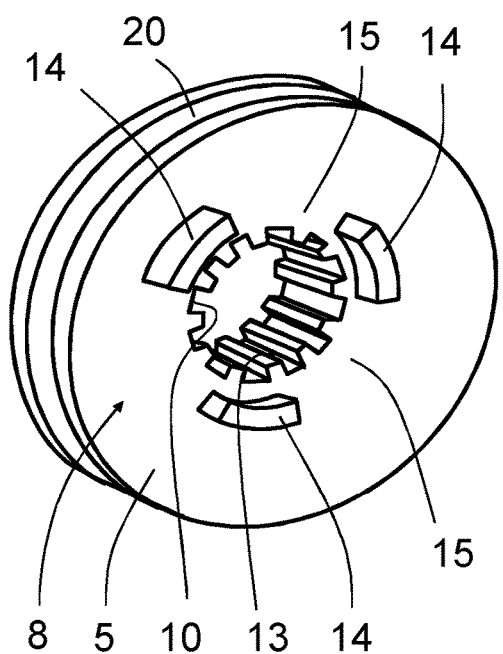
FIG.2A
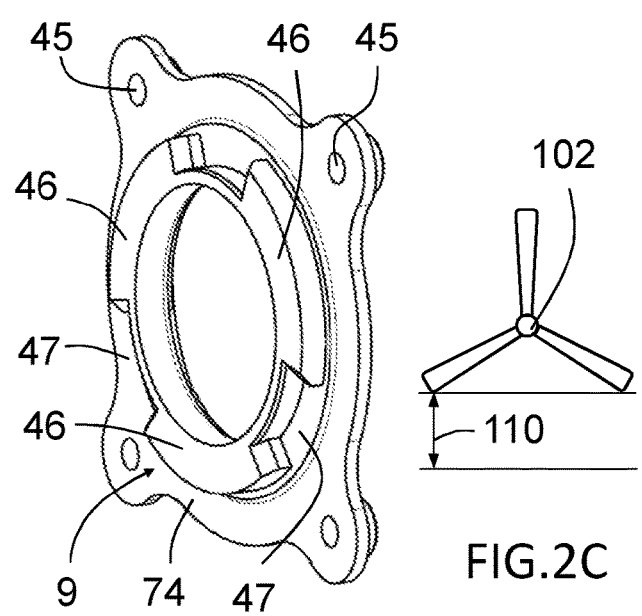
FIG.2B
FIG.2C

CLUTCH ARRANGEMENT FOR A ROADABLE AIRCRAFT

RELATED APPLICATION DATA

This application is a continuation of International Patent Application No. PCT/CN2019/074980, filed Feb. 13, 2019, which claims the benefit of European Patent Application No. 18161253.2 Mar. 12, 2018, the disclosures of which are incorporated herein by reference in their entireties.

TECHNICAL FIELD

The disclosure relates to a clutch arrangement for being located between an engine and a propeller of a drivetrain of a roadable aircraft. The disclosure also relates to a roadable aircraft comprising such a clutch arrangement.

A roadable aircraft is a vehicle that is suitable and configured for being driveable both in the air as an aircraft and on roads as a car.

BACKGROUND ART

Roadable aircrafts, in particular electrified roadable aircrafts, show increasing performance and reduced cost as a result of recent years of significant development of electrical battery technology. Consequently, in the field of roadable aircrafts there is an increasing demand for improving the strength and reliability of the various components and structures while maintaining a low weight and compact design.

For example, despite the activities in the field, there is a demand for an improved clutch arrangement which is capable of meeting the requirements as to cost, reliability, weight and available space in the roadable aircraft.

SUMMARY OF THE DISCLOSURE

Standard aircrafts typically have the propeller mounted directly on an output shaft of an engine. In roadable aircrafts however there is often a need to selectively connect and disconnect the propeller and engine for enabling use of the engine for road driving. Consequently, the engine is connected with and drives the propeller in a flying mode, and the engine is disconnected from the propeller in a road driving mode, in which the engine may be used for driving at least one road wheel of the roadable aircraft instead.

Moreover, it may be desired to keep the propeller in a propeller locked mode, i.e. non-rotational, when operating the roadable aircraft in the road driving mode, to prevent the propeller from spinning when wind catches the propeller blade, for example due to the general hazard of a spinning propeller to nearby people, or for keeping the propeller in a maximal ground clearance position during road driving.

Consequently, it is a general object of the present disclosure is to provide a clutch arrangement for being located between an engine and a propeller of a drivetrain of a roadable aircraft, which clutch arrangement enables selective setting of the clutch arrangement in a propeller propulsion mode and in a propeller locked mode, and which is relatively cost-efficient in terms of manufacturing, has high reliability and low weight and which has a compact overall design.

This and other objects, which will become apparent in the following, are accomplished by a clutch arrangement as defined in the accompanying independent claim. Details of some example embodiments and further optional features are recited in the associated dependent claims.

According to a first aspect of the present disclosure, there is provided a clutch arrangement for being located between an engine and a propeller of a drivetrain of a roadable aircraft. The clutch arrangement comprising an engine shaft, a propeller shaft, a stationary clutch arrangement housing and an engagement member which is rotationally locked to and axially slidable relative to propeller shaft. The engagement member comprises a first engagement structure for engaging a corresponding engagement structure associated with the engine shaft for setting the clutch arrangement in a propeller propulsion mode, in which rotational propulsion torque can be transmitted from the engine shaft to the propeller shaft via the engagement member. Furthermore, the engagement member also comprises a second engagement structure for engaging a corresponding engagement structure associated with the clutch arrangement housing for setting the clutch arrangement in a propeller locked mode, in which the propeller shaft is rotationally locked to the clutch arrangement housing by means of the engagement member.

In this way, it becomes possible to selectively set the clutch arrangement both in the propeller propulsion mode and in the propeller locked mode, sequentially, merely by controlling the axial position of a single engagement member relative to the propeller shaft. Hence, the engagement member has dual functionality in that it can transmit rotational propulsion torque from the engine shaft to the propeller shaft in one axial position and rotationally lock the propeller shaft to the stationary clutch arrangement housing an another axial position.

This dual functionality of the engagement member that is controlled by merely controlling the axial position of a single engagement member enables a significantly more compact design of the clutch arrangement and thereby also reduced weight of the clutch arrangement. For example, setting of the clutch arrangement in propeller propulsion mode and in propeller locked mode may be performed in a single clutch arrangement housing. Moreover, the dual functionality of the single engagement member results in a less complex design, thereby enabling a more cost-effective design with less individual components that can malfunction. Furthermore, axial control of the position of the single engaging member enables simplified, compact and cost-effective implementation of an engagement member position control arrangement that is configured for controlling the axial position of the engagement member.

Hence, in total, the disclosure provides a clutch arrangement that is relatively cost-efficient in terms of manufacturing, has improved reliability and reduced weight and which has a compact overall design.

In one example embodiment, none of the first and second engagement structures are engaged with corresponding engagement structure associated with the engine shaft or clutch arrangement housing when the engagement member is positioned in a neutral position located axially between the corresponding engagement structure associated with the engine shaft or clutch arrangement housing. Thereby the risk for interference between the rotatable engine shaft and stationary clutch arrangement housing is avoided. Moreover, the propeller is typically free to spin with the engagement member in the neutral position and it may in certain flying or road driving situations be desirable to allow the propeller to spin freely, considering that the clutch arrangement nearly always may be immediately selective set in the propeller propulsion mode and in a propeller locked mode when desired.

In one example embodiment, the engagement member comprises a synchroniser arrangement which, upon axial movement of the engagement member in an axial direction towards the corresponding engagement structure associated with the clutch arrangement housing, is configured for reducing a rotational speed of the propeller shaft before the second engagement structure engages with corresponding engagement structure associated with the clutch arrangement housing. Upon switching from flying mode to road driving mode there may be a desire to relatively quickly rotationally lock to propeller to prevent the propeller from uncontrolled spinning, for example due to the rotational moment of inertia of the propeller upon disconnecting the propeller shaft from a rotating engine shaft. One solution may be to simply force the second engagement structure into engagement with the corresponding engagement structure associated with the clutch arrangement housing despite a certain propeller speed. This may however result in damages to the second engagement structure and the corresponding engagement structure. An alternative solution for relatively quickly reducing any rotational speed of the propeller is to provide the engagement member with a synchroniser arrangement, which is configured for reducing a rotational speed of the propeller shaft before the second engagement structure engages with corresponding engagement structure associated with the clutch arrangement housing. Thereby the risk for damages to the clutch arrangement is reduced and the aim to relatively quickly rotationally lock to propeller to prevent the propeller from uncontrolled spinning is accomplished.

In one example embodiment, the synchroniser arrangement comprises a friction surface that is configured to engage a corresponding friction surface associated with the clutch arrangement housing for reducing the rotational speed of the propeller shaft before the second engagement structure engages with corresponding engagement structure associated with the clutch arrangement housing. By controlling the position of the synchroniser arrangement the kinetic energy of the rotating propeller may relatively quickly be converted into heat energy by having the friction surface of the synchroniser arrangement engaging the corresponding friction surface of the clutch arrangement housing.

In one example embodiment, the clutch arrangement further comprises an actuating arrangement for controlling the axial position of the engagement member, wherein the actuating arrangement comprises an axially slidable shift fork that is coupled with the engagement member such that the actuating arrangement can to control the axial position of the engagement member. By using an axially slidable shift fork design, similar to the design of shift forks for changing gears in conventional gear boxes, a technically well-proven and established technical concept is used, such that control of the axial position of the engagement member is accomplished with high reliability and robustness.

In one example embodiment, the actuating arrangement further comprises a rotatable shaft on which a cylindrical sleeve of the shift fork is located, wherein rotation of the rotatable shaft is transmitted to axial motion of the cylindrical sleeve by means of a transmission arrangement. Having of a transmission arrangement that converts rotation of the rotatable shaft to axial motion of the cylindrical sleeve enables use of a power source having a rotational output shaft for controlling the axial motion of the cylindrical sleeve, because the rotational output shaft of the power source may be rotationally connected to the rotatable shaft in a cost-efficient manner. The power source may for example be an electrical machine or a pneumatic driven or hydraulic driven motor.

In one example embodiment, the transmission arrangement comprises an external thread provided on the rotatable shaft and a mating internal thread provided on the cylindrical sleeve, such that rotation of the rotatable shaft is transmitted to axial motion of the cylindrical sleeve. Thereby a robust and reliable transmission arrangement is accomplished.

In one example embodiment, the actuating arrangement comprises a spring element for enabling spring-loading of the second engagement structure towards the corresponding engagement structure associated with the clutch arrangement housing. If the second engagement structure does not properly engage with the corresponding engagement structure associated with the clutch arrangement housing in specific relative rotational position, for example due to interference such as tooth-to-tooth engagement, the engagement member may possibly not attain the propeller locked mode as desired, and this may be a safety concern because the propeller may then possibly start spinning upon road driving due to air blast. A solution to this problem may be accomplished by having the second engagement structure spring-loaded towards the corresponding engagement structure associated with the clutch arrangement housing, because thereby the second engagement structure will automatically properly engage the corresponding engagement structure associated with the clutch arrangement housing after a certain angular rotation of the propeller, namely as soon as the engagement member becomes located in a rotational position in which the second engagement structure properly fits with the corresponding engagement structure, and the spring element forces the second engagement structure into proper engagement with the corresponding engagement structure.

In one example embodiment, the shift fork comprises at least three separate and individual parts assembled into a single shift fork: a cylindrical sleeve, a fork portion that is axially moveable relative to the cylindrical sleeve and arranged to engage the engagement member, and an axial spring element that is engaged with an axial surface of the cylindrical sleeve on one side of the spring element and with an axial surface of the fork portion on the other side of the spring element, such that the spring element may become axially compressed and such that the fork portion may become spring-loaded towards the corresponding engagement structure associated with the clutch arrangement housing upon axial movement of the cylindrical sleeve in the axial direction towards the corresponding engagement structure associated with the clutch arrangement housing. By having the spring element captured between the cylindrical sleeve and the fork portion the position control of the spring element is improved. Moreover, the fork portion may be made of a rigid and robust piece.

In one example embodiment, the spring element is located between an exterior cylindrical surface of the cylindrical sleeve and an interior cylindrical surface of the fork portion. Thereby, further improved position control of the spring element is accomplished, such that malfunction due to undesired displacement of the spring element is reduced.

In one example embodiment, the clutch arrangement further comprises an electrical machine for driving the rotatable shaft. An electrical machine is a highly reliable and compact power source that may be easily implemented in the clutch arrangement. The rotatable output shaft of the electrical machine is also suitable for being drivingly connected with the rotatable shaft of the actuating arrangement.

In one example embodiment, the clutch arrangement further comprises a planetary transmission rotatably connected between an output shaft of the electrical machine and the rotatable shaft of the actuating arrangement for operating as speed reduction unit between the electric machine and the rotatable shaft. The speed reduction unit results in increased torque. Hence, the deliverable output torque is significantly increased by means of the planetary transmission, such that a more robust motion control of the rotatable shaft is ensured.

The disclosure further relates to a roadable aircraft comprising a clutch arrangement as described above.

In one example embodiment, the roadable aircraft further comprises a propeller fastened to the propeller shaft, wherein the second engagement structure and the corresponding engagement structure associated with the clutch arrangement housing are configured such that rotational locking engagement of the second engagement structure with the corresponding engagement structure occur in certain rotational positions of the propeller. Thereby certain default propeller rotational locking positions may be provided, which may be beneficial if one or more specific rotational locking positions of the propeller are required during the road driving mode.

In one example embodiment, the second engagement structure and the corresponding engagement structure associated with the clutch arrangement housing are configured such that rotational locking engagement of the second engagement structure with the corresponding engagement structure occur only in those relative rotational positions of the propeller that the result in maximal ground clearance of the propeller. Thereby, the risk that the propeller becomes damaged due to interference with the ground or objects on the ground in reduced.

In one example embodiment, the second engagement structure comprises a plurality of protrusions, teeth, splines or claws, that can rotationally lock with corresponding protrusions, teeth, splines or claws of the corresponding engagement structure associated with the clutch arrangement housing only in certain rotational locking positions of the propeller shaft, and wherein the angular position of the propeller blades are matched to those certain rotational locking positions of the propeller shaft, such that the maximal ground clearance of the propeller blades is achieved in said rotational locking positions of the propeller shaft.

In one example embodiment of the roadable aircraft, when the cylindrical sleeve is in an axial position corresponding to the propeller locked mode and when the second engagement structure is not in locking engagement with the corresponding engagement structure the spring element is in an axially more compressed state. This means that a soon as the propeller for any reason rotates a certain degree to a rotational position where the second engagement structure indeed can engage with the corresponding engagement structure, it will do so caused by the a spring force from the spring element in the axially more compressed state that urges the second engagement structure into engagement with the corresponding engagement structure due to the spring element is in an axially more compressed state.

In one example embodiment of the roadable aircraft, when the cylindrical sleeve is in an axial position corresponding to the propeller locked mode and when the second engagement structure is in locking engagement with the corresponding engagement structure the spring element is in an axially less compressed state. As mentioned above, as that a soon as the second engagement structure can engage with the corresponding engagement structure, it will do so caused by the spring force from the spring element. Hence, when the second engagement structure is in locking engagement with the corresponding engagement structure the spring element is in an axially less compressed state.

In one example embodiment, the roadable aircraft further comprises a combustion engine drivingly connected to the propeller via the clutch arrangement, a first electrical machine drivingly connected to the combustion engine and drivingly connected to the propeller via the clutch arrangement, an electrical battery for storing electrical energy generated by the first electrical machine, at least one driving wheel for driving the roadable aircraft on roads, a second electrical machine drivingly connected to the at least one driving wheel, wherein the combustion engine and the first electrical machine are configured for driving the propeller individually or jointly. This design thus corresponds to a hybrid electric roadable aircraft that in the flying mode may be powered by the combustion engine and/or the first electrical machine, and in the road driving mode may be powered second electrical machine. However, in the road driving mode, the combustion engine may be used for driving the first electrical machine for generating electrical energy to be stored in a battery and subsequently used by the second electrical machine in the road driving mode. In other word, the drive train of the hybrid electric roadable aircraft used in flying mode has a parallel hybrid layout, and the drive train used in road driving mode has a series hybrid layout.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which:

FIG. 1A shows cross-sectional view of a first example embodiment of the clutch arrangement;

FIG. 1B shows a cross-sectional view of an alternative example embodiment of the clutch arrangement;

FIG. 2A shows an example embodiment of the second engagement structure of the engagement member;

FIG. 2B shows an example embodiment of a separate engagement ring carrying a corresponding engagement structure associated with the clutch arrangement housing;

FIG. 2C shows a view of a propeller in a maximal ground clearance position;

DETAILED DESCRIPTION OF EXAMPLE EMBODIMENTS OF THE DISCLOSURE

Figure 3:
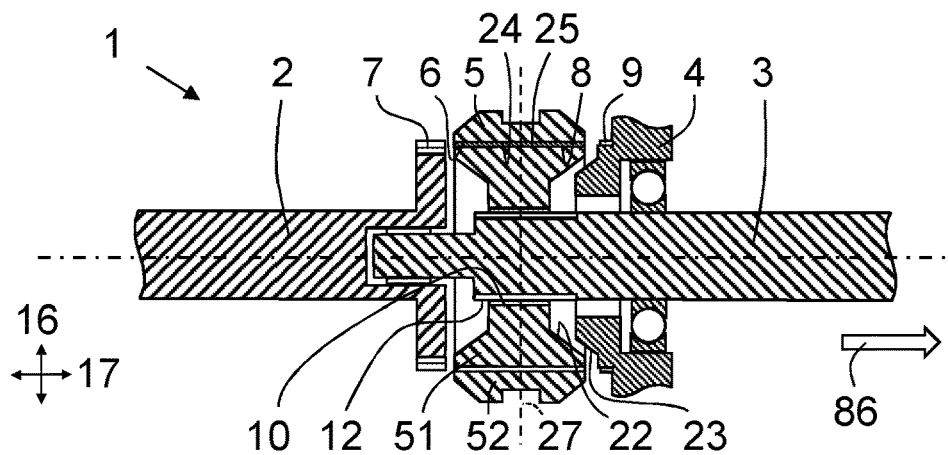
FIGS. 3-6 shows a further example embodiment of the clutch arrangement in various operating modes.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Referring now to FIG. 1A, there is depicted a first schematic example embodiment of a clutch arrangement 1 according to the disclosure. The clutch arrangement 1 is particularly suitable for being located between an engine and a propeller of a drivetrain of a roadable aircraft, however other applications may exist.

The clutch arrangement comprises an engine shaft 2, a propeller shaft 3, a stationary clutch arrangement housing 4 and an engagement member 5 which is rotationally locked to and axially slidable relative to propeller shaft 3. The clutch arrangement has a radial direction 16 and an axial direction 17, which is perpendicular to the radial direction and parallel with a longitudinal axis of the engine and propeller shafts 2, 3.

The engagement member 5 may for example have a substantially annular overall shape with a radially internal surface 10 that is arranged to axially slide on, and relative to, a radially external surface 11 of the propeller shaft 3. In order to provide the rotational locking of the engagement member 5 relative to the propeller shaft 3 various alternatives are possible. For example, the internal surface 10 of the engagement member 5 may be cylindrical and have axial splines that are arranged to interact with corresponding axial splines 12 provided on the external cylindrical surface of the propeller shaft 3 for providing the relative rotational locking while allowing relative axial motion between the engagement member 5 and propeller shaft 3. Alternatively, the engagement member 5 may be designed to having a non-cylindrical internal surface 10 that is arranged to fit on a corresponding non-cylindrical external surface 11 of the propeller shaft 3 for providing the relative rotational locking while allowing relative axial motion between the engagement member 5 and propeller shaft 3.

One or both of the engine shaft 2 and propeller shaft 3 may of course be composed of a single shaft or multiple individual interconnected and mutually rotationally locked shaft segments.

The engagement member 5 comprises a first engagement structure 6 for engaging a corresponding engagement structure 7 associated with the engine shaft 2 for setting the clutch arrangement 1 in a propeller propulsion mode, in which rotational propulsion torque can be transmitted from the engine shaft 2 to the propeller shaft 3 via the engagement member 5.

Moreover, the engagement member 5 further comprises a second engagement structure 8 for engaging a corresponding engagement structure 9 associated with the clutch arrangement housing 4 for setting the clutch arrangement 1 in a propeller locked mode, in which the propeller shaft 3 is rotationally locked to the clutch arrangement housing 4 by means of the engagement member 5.

Consequently, by having an engagement member 5 that is rotationally locked to and axially slidable relative to propeller shaft 3 the engagement member 5 can be controlled to selectively engage either the engine shaft 2 for transmitting rotational torque from the engine shaft 2 to the propeller shaft 3, or the clutch arrangement housing 4 for rotationally locking of the propeller shaft to stationary clutch arrangement housing 4. In other word, simply be controlling the axial position of the engagement member 5 relative the propeller shaft 3 the clutch arrangement may be set in either a propeller propulsion mode or a propeller locked mode.

The engagement member 5 of FIG. 1A is provided with a peripheral external groove 20 for enabling proper engagement between the engagement member 5 and an actuating arrangement (not showed) used for exerting an axial force on engagement member 5 for the purpose of moving the engagement member 5 axially relative to the propeller shaft 3. However, other ways for allowing the actuating arrangement to engage and exert axial force on the engagement member 5 exists, such as for example a member that engages the outer axial sides 21 of the engagement member 5 instead.

FIG. 1A shows the example embodiment clutch arrangement 1 set in neutral mode. This is accomplished when the engagement member 5 is positioned in a neutral position located axially between the corresponding engagement structure 7, 9 associated with the engine shaft 1 or clutch arrangement housing 4, in which position none of the first and second engagement structures 6, 8 are engaged with the corresponding engagement structure 7, 9 associated with the engine shaft 2 or clutch arrangement housing 4.

A bearing 18, such as roll bearing may be provided between the propeller shaft 3 and the clutch arrangement housing 4 for enabling relative rotational motion there between. Similarly, if the engine shaft 2 and propeller shaft 3 are partly telescoped with each other, i.e. having one shaft axially protruding into the other shaft a certain axial distance, for providing improved position control of said shafts 2, 3, a bearing 19, such as roll bearing may be provided between the propeller shaft 3 and the engine shaft 2 for enabling relative rotational motion there between.

Both the first and second engagement structures 6, 8 and their respective corresponding engagement structures 7, 9 may be in the shape of teeth, splines, claws, protrusions or the like that interact with each to provide mutual rotational locking by means of internal interference between the structure and corresponding structure.

The first and second engagement structures 6, 8 and their respective corresponding engagement structures 7, 9 schematically illustrated in FIG. 1A resemble a dog clutch type, where the first engagement structure 6 is located on an axial side of the engagement member 5, and the corresponding engagement structure 7 is located on an axial side of a portion of the engine shaft 2, such that the first engagement structure 6 actually faces the engagement member 5. However, first and second engagement structures 6, 8 and their respective corresponding engagement structures 7, 9 may alternatively be located on a radial external or internal surface of the engagement member 5, engine shaft 2 and clutch arrangement housing 4, as described more in detail below with respect to another example embodiment.

An alternative example embodiment of the clutch arrangement 1 of FIG. 1A is showed in FIG. 1B. The clutch arrangement 1 of FIG. 1B differs from the clutch arrangement 1 of FIG. 1A only in the clutch arrangement 1 does not have a neutral mode. In other words, there is no axial position of the engagement member 5 available in which none of the first and second engagement structures 6, 8 are engaged with the corresponding engagement structure 7, 9 associated with the engine shaft 2 or clutch arrangement housing 4. Either the first engagement structure 6 or the second engagement structure 8 are always engaged with a corresponding engagement structure 7, 9. And when the engagement member 5 is located in the centre between the corresponding engagement structures 7, 9 both first and second engagement structures 6, 8 are engaged with the corresponding engagement structure 7, 9 simultaneously. In FIG. 1B the first engagement structure 6 is showed in engaged state with the corresponding engagement structure 7. A clutch arrangement 1 without a neutral mode may be advantageous in certain situations.

FIG. 2A schematically illustrates a 3D-view of an example embodiment of an engagement member 5 having a substantially annular overall shape with a radially internal surface 10 with axial splines 13 that are arranged to interact with corresponding axial splines 12 provided on the external cylindrical surface of the propeller shaft 3. The second engagement structure 8 is here schematically shown in form of three arc-shaped protrusions 14 that located spread out along the annular length of the engagement member 5, and with recesses 15 formed between neighbouring protrusions 14. The protrusions of the corresponding engagement structure 7 (not showed), which has a similar design as the second engagement structure 8, are configured to be axially displaceable into to recesses 15 formed between said protrusions 14 to provide the desired rotational interference between said parts. Many alternative designs are of course possible in terms of design of the first and second engagement structures 6, 8 and their respective corresponding engagement structures 7, 9. Moreover, the first and second engagement structures may have the same of different designs, depending on the circumstance.

In the example embodiments of the clutch arrangement 1 shown in FIGS. 1A and 1B the corresponding engagement structure 9 associated with the clutch arrangement housing 4 is integrally formed with the clutch arrangement housing 4. However, the corresponding engagement structure 9 associated with the clutch arrangement housing 4 may alternatively be provided on an individual and separate engagement ring 74 that is fastened and rotationally secured to clutch arrangement housing 4. A 3D-view of an example embodiment of such an individual and separate engagement ring 74 is showed FIG. 2B.

The engagement ring 74 has a substantially annular overall shape and attachment holes 45 for securing the engagement ring 74 to the clutch arrangement housing 4. The corresponding engagement structure 9 has in this example embodiment three arc-shaped protrusions 46 that are located spread out along an annular length of the engagement ring 74, and with recesses 47 formed between neighbouring protrusions 46 for receiving protrusions 14 of an associated axially moveable engagement member 5, which in this embodiment would also have three arc-shaped protrusions 14.

The engagement ring 74 of FIG. 2B that has a corresponding engagement structure 9 with three arc-shaped protrusions 46 may for example be used for locking a three-winged propeller in three distinct rotational positions.

The relative rotational attachment of the propeller on the propeller shaft 3, and the relative rotational attachment of the engagement member 5 on the propeller shaft 3, and the relative rotational attachment of the engagement ring 74 on clutch arrangement housing 4, and the rotational locking matching of the second engagement structure 8 with the corresponding engagement structure 9 of the engagement ring 74 are suitably configured such that locking engagement of the second engagement structure 8 with the corresponding engagement structure 9 of the engagement ring 74 occur only in certain predetermined rotational positions of the propeller, such as for example only in those relative rotational positions of the propeller that the result in maximal ground clearance of the propeller.

This effect is illustrated in FIG. 2C, which shows a three-winged propeller 102 in a rotational position that results in maximal ground clearance 110 of the propeller 102. Thereby, the risk of damages to the propeller during road driving if the roadable aircraft is minimized.

In detail, the rotational locking in certain rotational positions only is accomplished by providing the second engagement structure 8 with a plurality of protrusions, teeth, splines or claws, that can rotationally lock with corresponding protrusions, teeth, splines or claws of the corresponding engagement structure 9 associated with the clutch arrangement housing 4 only in certain rotational locking positions of the propeller shaft 3, and subsequently match the angular position of the propeller blades to those certain rotational locking positions of the propeller shaft 3.

FIG. 3-6 schematically shows different working modes of an alternative example embodiment of the clutch arrangement 1 according to the disclosure. The engine shaft 2, propeller shaft 3 and clutch arrangement housing 4 is substantially similar in design and functionality as what has been described with reference to FIG. 1. However, the engagement member 5 has a different design, as well as the first and second engagement structures 6, 8 and their respective corresponding engagement structures 7, 9. Moreover, the engagement member 5 comprises a synchroniser arrangement.

In situations when the clutch arrangement is arranged in the propeller propulsion mode but a switch to the propeller locked mode is about to occur, there may be situations wherein the propeller still has a certain rotation speed, thereby complicating the switch to the propeller locked mode. One option may be simply axially move the engagement member 5 for engagement between the second engagement structure 8 with the corresponding engagement structure 9 despite the still existing relative rotational speed difference between the propeller shaft 3 and clutch arrangement housing, but thereby risking significant damage to the second engagement structure 8 and corresponding engagement structure 9. Alternatively, a user may wait until the rotational speed of the propeller has stopped and thereafter moving the engagement member 5 for engagement between the second engagement structure 8 with the corresponding engagement structure 9. However, this waiting time maybe annoying to the user.

Hence, there is a desire to being able to immediately switch from the propeller propulsion mode to the propeller locked mode also in situations wherein the propeller still has a certain rotational speed, without risk for damages and without having to wait until the propeller stops rotating. This is solved by providing the engagement member 5 with a synchroniser arrangement which, upon axial movement of the engagement member 5 in an axial direction towards the corresponding engagement structure 9 associated with the clutch arrangement housing 4, is configured for relatively quickly reducing a rotational speed of the propeller shaft. The reduction in rotational speed is accomplished before the second engagement structure 8 actually engages with corresponding engagement structure 9 associated with the clutch arrangement housing 4, such that no damage to the second engagement structure 8 and corresponding engagement structure 9 occurs.

In the specific example embodiment of FIG. 3-6 the synchroniser arrangement comprises a conical friction surface 22 that is configured to engage a corresponding conical friction 23 surface associated with the clutch arrangement housing 4 for the purpose of braking the propeller and thus reducing the rotational speed of the propeller shaft.

The friction surfaces 22, 23 may be metal surfaces of each respective part, or special high-friction materials that are attached to each respective part.

For avoiding any damage to the second engagement structure 8 and corresponding engagement structure 9 it is relevant to perform the speed synchronisation before the second engagement structure 8 engages with the corresponding engagement structure 9. Hence, starting from a neutral axial position of the engaging member 5, upon axial movement of the engagement member towards the corresponding engagement structure 9 associated with the clutch arrangement housing 4, the synchroniser arrangement becomes active in a first axial position, and thereafter, when the synchroniser arrangement has caused the rotational speed of the propeller shaft to become stopped or nearly stopped, the engagement member 5 is moved axially further towards the corresponding engagement structure 9 to a second axial position, in which the second engagement structure 8 is properly engaged with the corresponding engagement structure 9. Since the second engagement structure 8 is not engaged with corresponding engagement structure 9 in the first axial position the risk for damages is avoided.

The functionality of having the synchroniser arrangement active in a first axial position of the engagement member 5 but still not having engagement between the second engagement structure 8 and the corresponding engagement structure 9, and subsequently having engagement between the second engagement structure 8 and the corresponding engagement structure 9 first after movement of the engagement member 5 into the second axial position, is accomplished by having engagement member comprising at least two-parts.

The engagement member 5 shown in FIG. 3 comprises at least two parts, an inner part 51 and an outer part 52. Both the inner and outer parts 51, 52 may have a substantially annular form.

The inner part 51 is rotationally locked to the propeller shaft 3 while being axially slideable relative to the propeller shaft 3. This may for example be accomplished by providing the internal surface 10 of the inner part 51 with axial splines that are arranged to interact with corresponding axial splines 12 provided on the external cylindrical surface of the propeller shaft 3 for providing the relative rotational locking while allowing relative axial motion between the inner part 51 and propeller shaft 3.

Similarly, the outer part 52 is rotationally locked to the inner part 51 while being axially slideable relative to the inner part 51. This may for example be accomplished by providing an internal surface 24 of the outer part 52 with axial splines, teeth or projections that are arranged to interact with corresponding axial splines, teeth or projections provided on the external cylindrical 25 surface of the inner part 51.

FIG. 3 shows the clutch arrangement 1 with the engagement member 5 in a neutral axial position 27, in which the engagement member 5 disengaged with both engine shaft 2 and clutch arrangement housing 4, and the synchroniser arrangement is a non-active mode. The inner and outer parts 51, 52 of the engagement member 5 is positioned at substantially the same axial position, namely the neutral axial position 27.

Figure 4:
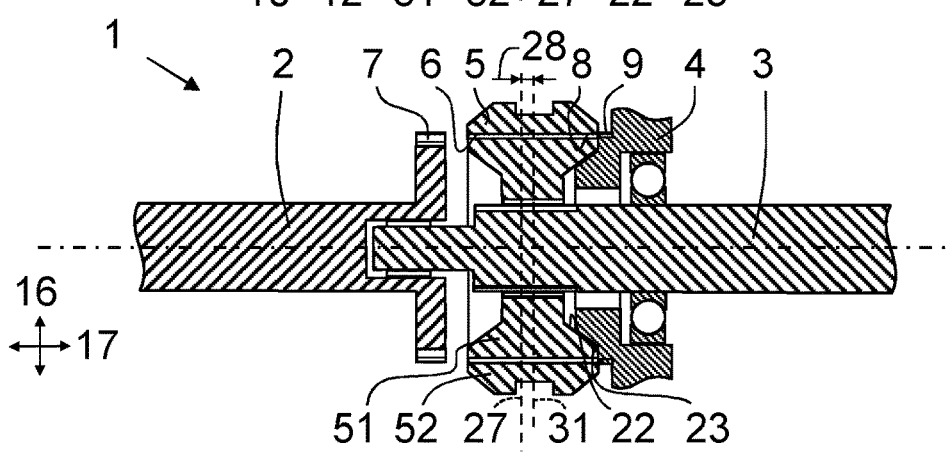

In FIG. 4 the engagement member 5 has been displaced axially a first distance 28 towards the corresponding engagement structure associated with the clutch arrangement housing 4, such that the engagement member 5 is located in a first axial position 31 and the synchroniser arrangement is an active mode. In other words, the conical friction surface 22 of the engagement member 5 is now located in an axial position in which said conical friction surface 22 engages the corresponding conical friction 23 surface associated with the clutch arrangement housing 4, such that braking of the propeller and rotational speed reduction of the propeller shaft 3 is accomplished by converting the rotational kinetical energy of the propeller and propeller shaft 3 into heat via the friction surfaces 22, 23. The inner and outer parts 51, 52 of the engagement member 5 are still positioned at substantially the same axial position, i.e. the first axial position 31.

Figure 5:
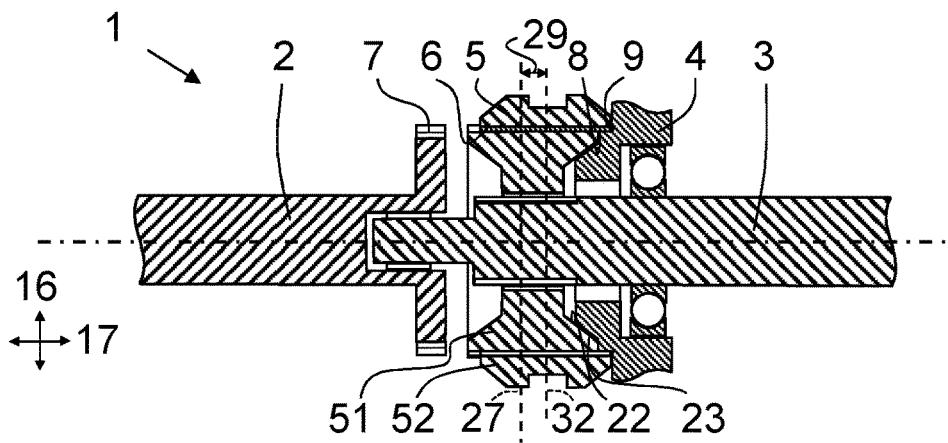

As shown in FIG. 5, when the rotational speed of the propeller shaft 3 have been reduced to zero or near zero the outer part 52 of the engagement member 5 may be axially displaced to a second axial position 32, which is positioned a second distance 29 towards the corresponding engagement structure associated with the clutch arrangement housing 4 from the neutral axial position 27. Thereby, the second engagement structure 8 is in locking engagement with the corresponding engagement structure 9 and the clutch arrangement 1 is in a propeller locked mode.

The second axial position 32 is located further towards the corresponding engagement structure associated with the clutch arrangement housing 4 than the first axial position 31. The inner part 51 of the engagement member 5 remain in the first axial position 31, meaning that the inner and outer parts 51, 52 of the engagement member 5 are not positioned at the same axial position.

Figure 6:
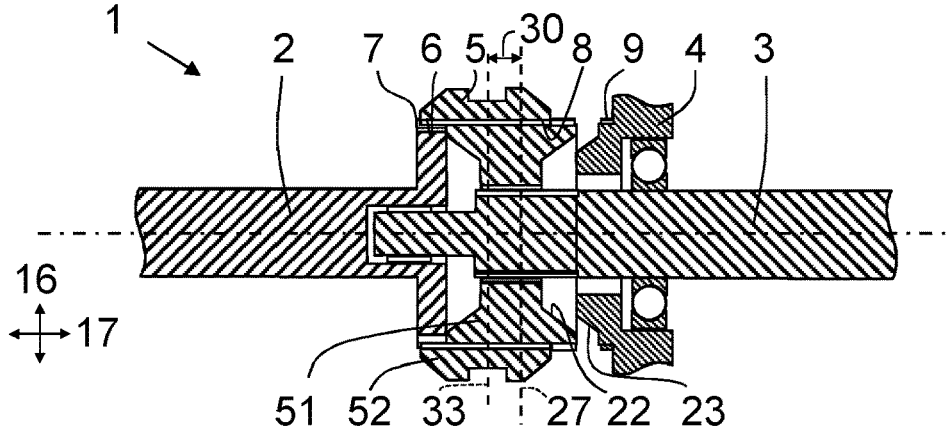

FIG. 6 illustrates the clutch arrangement 1 in the propeller propulsion mode. Here, the engagement member 5 is axially displaced to a third axial position 33, which is positioned a third distance 30 towards the corresponding engagement structure 7 associated with the engine shaft 2, as seen from the neutral axial position 27 of the engagement member 5. Thereby, the first engagement structure 6 is in locking engagement with the corresponding engagement structure 7.

Since there typically is no need for synchronising the rotation speed of the engine shaft and propeller shaft before setting the clutch arrangement 1 in the propeller propulsion mode, three is typically no need for providing the synchroniser arrangement 1 with a friction surface 22 that is configured to engage a corresponding friction surface associated with the engine shaft 2. However, this can of course be implemented when there is such a need.

In the example design of the clutch arrangement schematically showed in FIGS. 3-6 the inner and outer parts 51, 52 of the engagement member 5 are not positioned at the same axial position in the propeller propulsion mode.

FIGS. 7-10 schematically shows different working modes of still a further alternative example embodiment of the clutch arrangement 1 according to the disclosure. This example embodiment of the clutch arrangement 1 shows more features of the clutch arrangement 1, such as the actuating arrangement 70, an electrical machine 71 for driving the actuating arrangement 70, a more detailed example of a clutch arrangement housing 4, etc. This example embodiment of the clutch arrangement 1 also show an alternative design of the engagement member 5 and the synchroniser arrangement.

Figure 7:
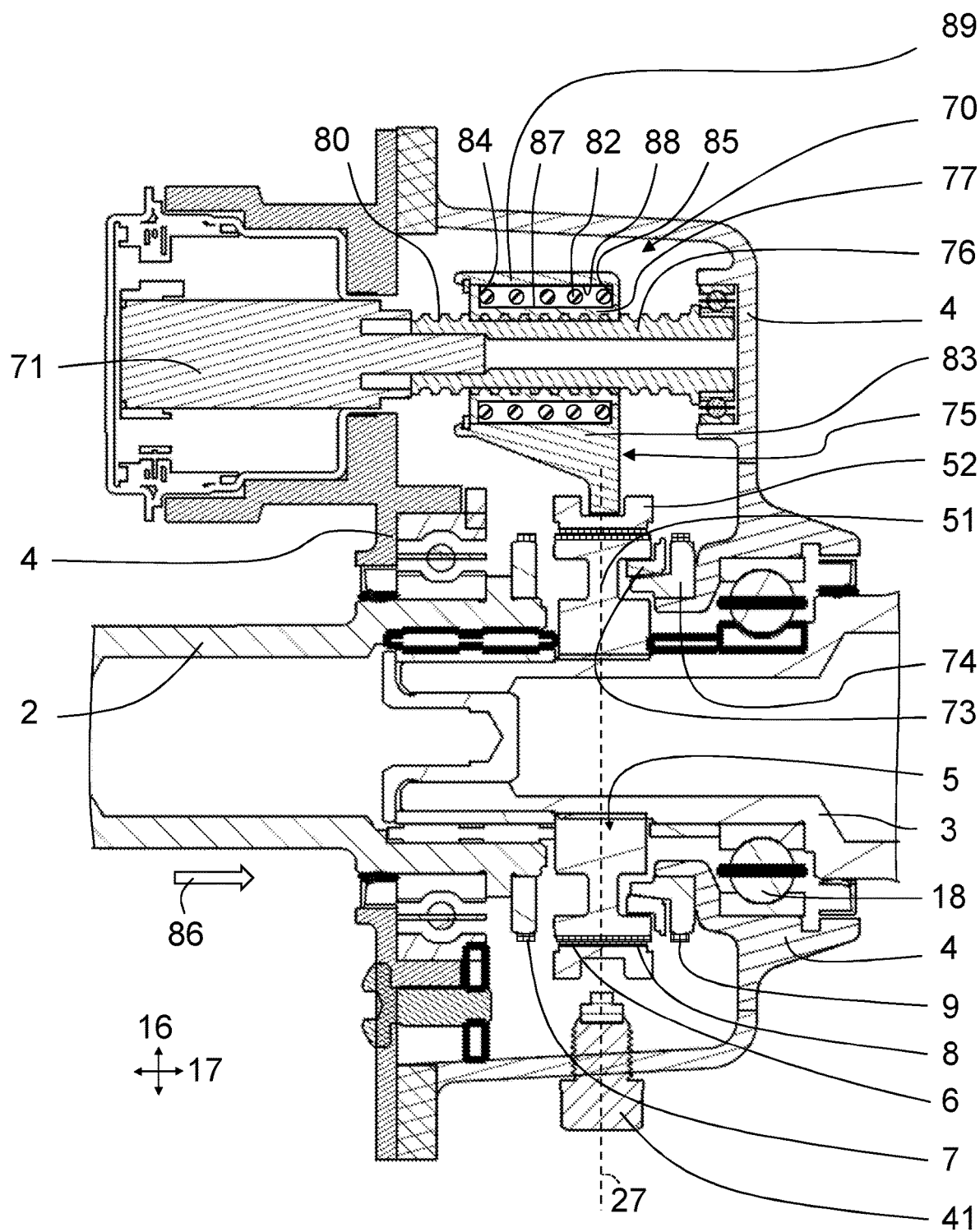
FIGS. 7-10 shows a still a further example embodiment of the clutch arrangement in various operating modes.
Figure 8:
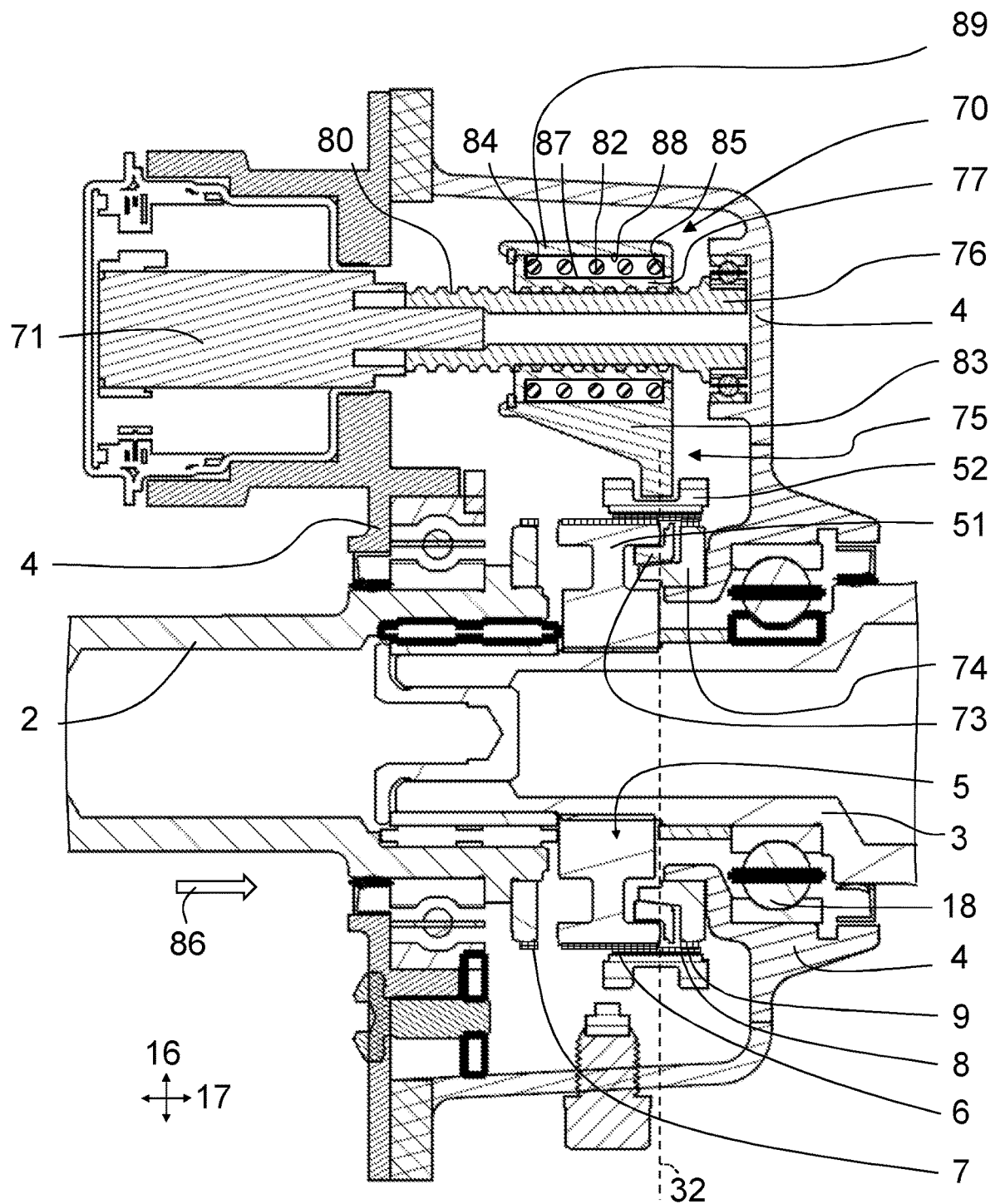
Figure 9:
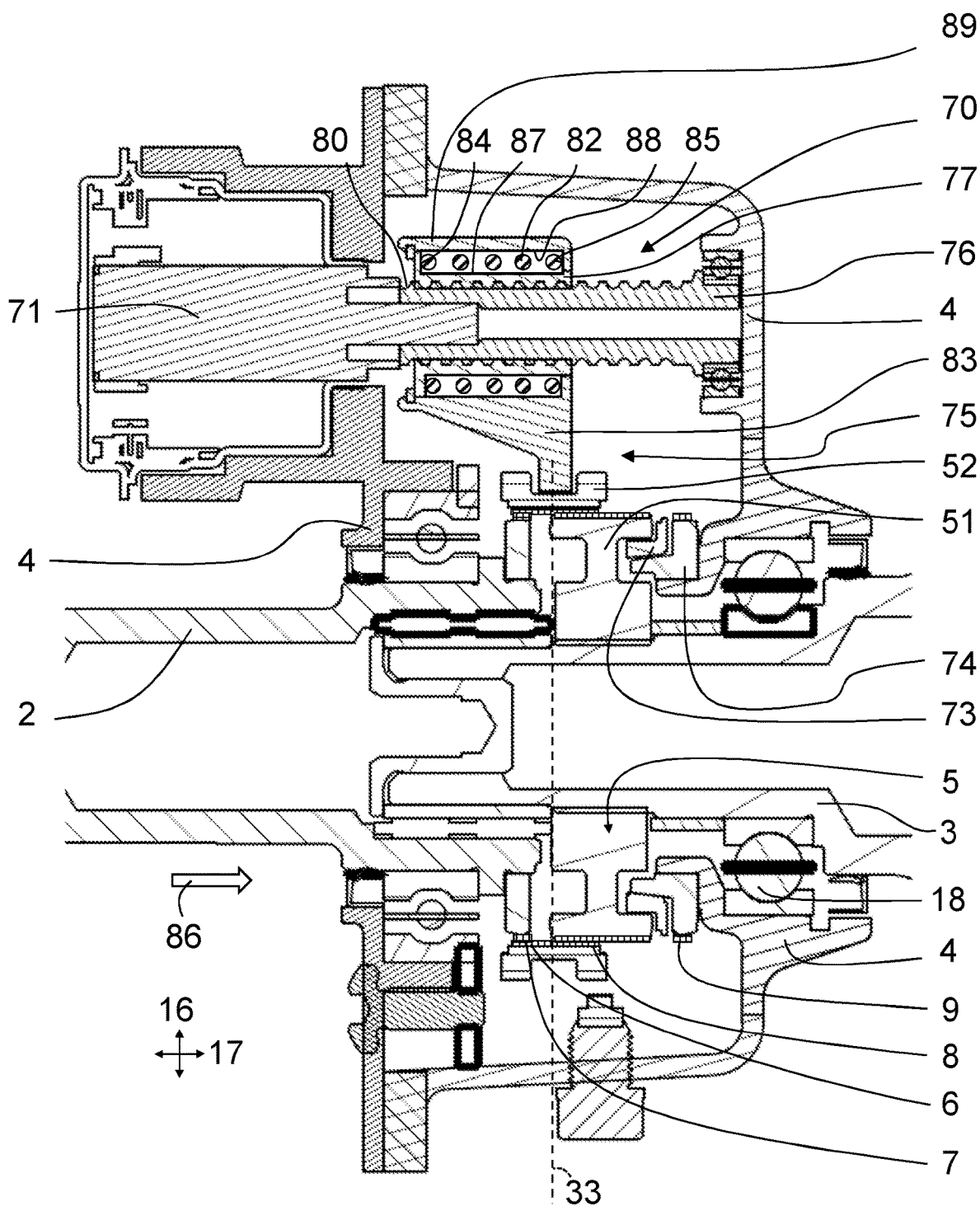

FIG. 7 shows the clutch arrangement 1 in the neutral mode, FIG. 8 shows the clutch arrangement 1 in the propeller locked mode, and FIG. 9 shows the clutch arrangement 1 in the propeller propulsion mode.

The engagement member 5 according to the example embodiment of FIGS. 7-9 comprises an inner part 51 and an outer part 52, wherein the inner part 51 is rotationally and axially locked to the propeller shaft 3, for example by means of splines, teeth, projections or the like as described with reference to FIGS. 3-6. The outer part 52 is rotationally locked to the inner part 51 while being axially slideable relative to the inner part 51, for example by means of splines, teeth, projections, or the like as described with reference to FIGS. 3-6.

The synchroniser arrangement of the engagement member 5 includes an individual and separate synchroniser ring 73 that is rotationally locked to the outer part 52, wherein the synchroniser ring 73 comprises the conical friction surface that is configured to engage the corresponding conical friction surface associated with the clutch arrangement housing 4. The corresponding conical friction surface associated with the clutch arrangement housing 4 is here located on an individual and separate engagement ring 74 that is rotationally locked to clutch arrangement housing 4.

In the neutral position of the engagement member 5, as showed in FIG. 7, the frictional surface of the synchroniser ring 73 is not in contact with the corresponding friction surface of the engagement ring 74.

The illustrated actuating arrangement 70 is configured for controlling the axial position of the engagement member 5. For this purpose, the actuating arrangement 70 comprises an axially slidable shift fork 75 that is coupled with the engagement member 5, in particular a groove formed in an external surface of the outer part 52 of the engagement member 5.

Consequently, by axial displacement of the shift fork 75 the engagement member 5, in particular at least the outer member 52 of the engagement member 5, is correspondingly axially displaced. Thereby, the actuating arrangement 70 can to control the axial position of the engagement member 5.

An output shaft of the illustrated electrical machine 71 is rotationally connected with a rotatable shaft 76 of the actuating arrangement 70. The shift fork 75 comprises a cylindrical sleeve 77 that is located on and surrounding the rotatable shaft 76, and rotation of the rotatable shaft 76 is transmitted to axial motion of the cylindrical sleeve 77 by means of a transmission arrangement.

The transmission arrangement is thus composed of a feature on the rotatable shaft 76 that is configured to interact with a corresponding feature on the cylindrical sleeve 77 of the shift fork 75. The specific designs of said feature and corresponding feature may have various forms. At least one of the said feature and corresponding feature typically has a shape that includes a helical characteristic for converting a rotational movement of the rotatable shaft 76 to axial motion of the cylindrical sleeve 77.

As mention above, FIG. 7 shows the clutch arrangement 1 with the engagement member 5 in a neutral axial position 27, in which the engagement member 5 disengaged with both engine shaft 2 and clutch arrangement housing 4, and the synchroniser arrangement is a non-active mode When the engagement member 5 is moved in the axial direction 86 towards the corresponding engagement structure 9 associated with the clutch arrangement housing 4 the engagement member 5 becomes located in the first axial position and the synchroniser arrangement becomes active. In other words, the conical friction surface of the synchroniser ring 73 becomes located in an axial position in which said conical friction surface engages the corresponding conical friction surface of the engagement ring 74, such that braking of the propeller and rotational speed reduction of the propeller shaft 3 is accomplished.

Thereafter, when the rotational speed of the propeller shaft 3 have been reduced to zero or near zero the outer part 52 of the engagement member 5 may be axially displaced to the second axial position 32, as illustrated in FIG. 8. In the second axial position 32 the second engagement structure 8 is in locking engagement with the corresponding engagement structure 9 and the clutch arrangement 1 is in a propeller locked mode.

FIG. 9 illustrates the clutch arrangement 1 in the propeller propulsion mode, in which the engagement member 5 is axially displaced to a third axial position 33, which is positioned closer towards the corresponding engagement structure 7 associated with the engine shaft 2 than the neutral axial position 27 of the engagement member 5. Thereby, the first engagement structure 6 is in locking engagement with the corresponding engagement structure 7.

No synchronisation arrangement is provided for engaging the engine shaft in this example embodiment because there is typically is no need for synchronising the rotational speed of the engine shaft 2 and propeller shaft 3 before setting the clutch arrangement 1 in the propeller propulsion mode. However, this can of course be implemented when there is such a need.

Furthermore, the clutch arrangement 1 may further comprise a speed reduction unit, such as for example a planetary transmission 72 (FIGS. 11-13), rotatably connected to an output shaft of the electrical machine 71 and the rotatable shaft 77 of the actuating arrangement 70 for operating as speed reduction unit and torque multiplier between the electric machine 71 and the rotatable shaft 76.

Figure 10:
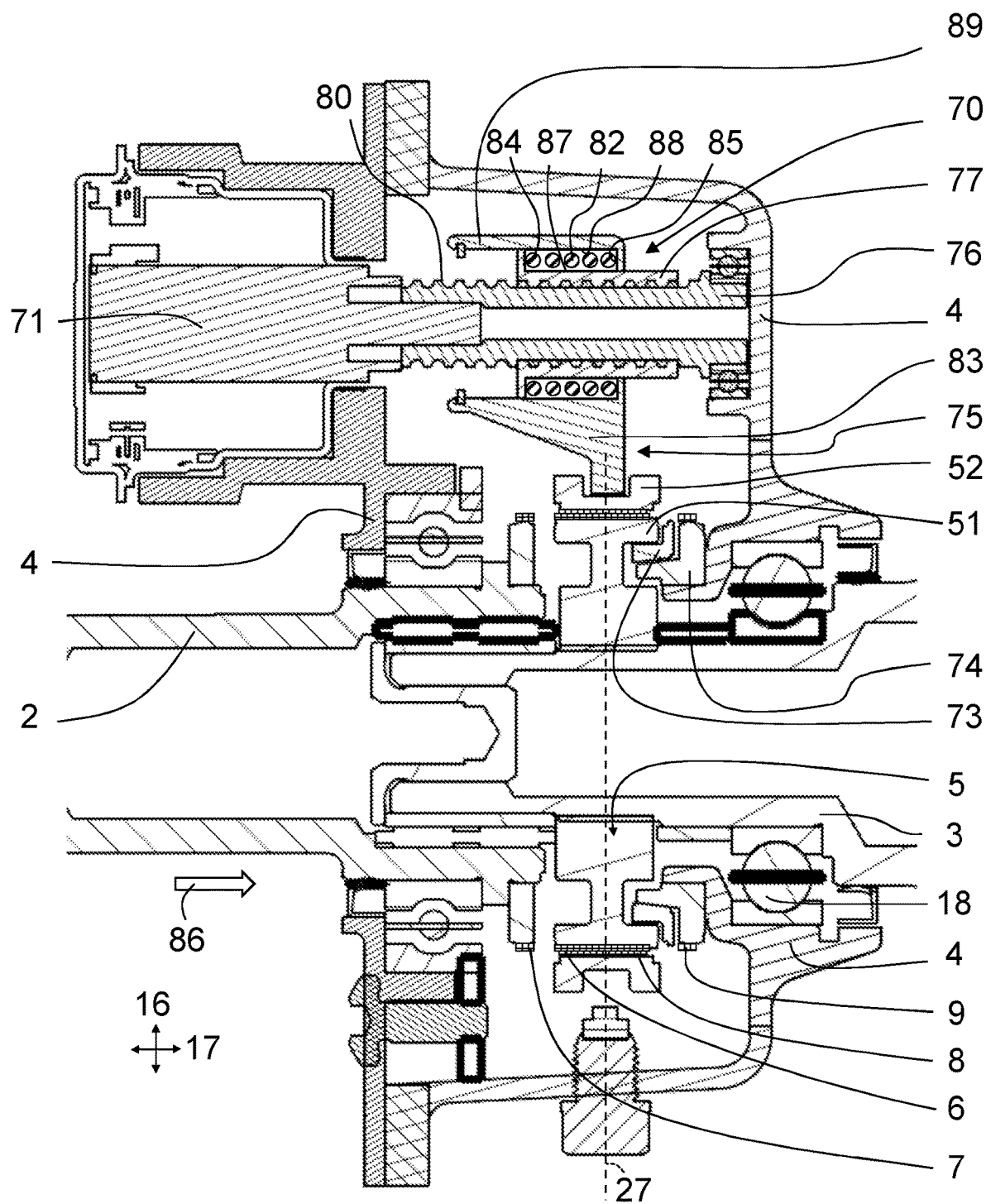

One example design solution of the actuating arrangement 70 is illustrated in FIGS. 7-10. FIGS. 7-9 illustrate the actuating arrangement 70 with a spring element 82 in a less axially compressed state and FIG. 10 schematically shows the actuating arrangement 70 with the spring element 82 in a more axially compressed state.

The shift fork 75 comprises a spring element 82 for enabling spring-loading of the second engagement structure 8 towards the corresponding engagement structure 9 associated with the clutch arrangement housing 4. In other words, the rotatable shaft 76 may be controlled to attain a position in which the shift fork 75 normally would set the engagement member 5 in the propeller locked mode. However, in certain situation the shift fork 75 may be prevented from reaching the propeller locked mode, for example due to interference between the second engagement structure 8 and the corresponding engagement structure 9 at the present angular position. In such event the spring element 82 becomes further compressed instead and exerts an urging force on the shift fork 75 towards the corresponding engagement structure 9 associated with the clutch arrangement housing 4.

As a result, as soon as the interference situation is eliminated, for example due to a certain angular displacement of the propeller shaft 3, the shift fork 75 and the engagement member 5 will more towards the corresponding engagement structure 9, the spring element 82 will becomes less compressed, and the second engagement structure 8 will properly engage with the corresponding engagement structure 9.

Said spring-loading of the second engagement structure 8 towards the corresponding engagement structure 9 by means of the spring element 82 may be provided by means of various design solutions.

In the example embodiment depicted in FIGS. 7-10 the shift fork 75 comprises at least three separate and individual parts assembled into a single shift fork 75. A first part is a cylindrical sleeve 77, a second part is a fork portion 83 that is axially moveable relative to the cylindrical sleeve 77 and relative to the rotatable shaft 76 and arranged to engage the engagement member 5, and a third part is the axial spring element 82 that is engaged with an axial surface 84 of the cylindrical sleeve 77 on one side of the spring element 82 and with an axial surface 85 of the fork portion 83 on the other, axially opposite, side of the spring element 82.

The spring element 82 is here illustrated in form of a helical compression spring but other types of springs may alternatively be used, such as disc spring, elastic material, or the like.

The transmission arrangement of the actuating arrangement 70 is here composed of an external thread 80 that is provided on the external surface of the rotatable shaft 76 and a mating internal thread provided on the cylindrical sleeve 77, such that rotation of the rotatable shaft 76 is transmitted to axial motion of the cylindrical sleeve 77.

Thereby, upon axial movement of the cylindrical sleeve 77 in the axial direction 86 towards the corresponding engagement structure 9 associated with the clutch arrangement housing 4 the spring element 82 may become axially compressed between the axial surface 84 of the cylindrical sleeve 77 and the opposite axial surface 85 of the fork portion 83. As a result, the fork portion 83 may become spring-loaded towards the corresponding engagement structure 9 associated with the clutch arrangement housing 4 if the fork portion 83 is prevented from being displaced towards said corresponding engagement structure 9, for example due to temporary interference between the second engagement structure 8 and the corresponding engagement structure 9 at the present angular position.

The fork portion may comprise two engagement arms (not showed) located in a plane that is substantially perpendicular to the axial direction of the rotatable shaft 76 and arranged to at least partly surround the engagement member 5.

In the example embodiment of FIGS. 7-10 the fork portion 83 comprises an additional cylindrical sleeve 89 that is configure to be located on and surrounding the cylindrical sleeve 77, which is configured act as a guiding member for said additional cylindrical sleeve 89. The spring element 82 may advantageously be located between an exterior cylindrical surface 87 of the cylindrical sleeve 77 and an interior cylindrical surface 88 of the additional cylindrical sleeve 89 of the fork portion 83.

The position and state of the cylindrical sleeve 77, spring element 82 and fork portion showed in FIG. 7 may for example be deemed corresponding to having the clutch arrangement 1 in the neutral mode. Moreover, the position of the cylindrical sleeve 77 in FIG. 10 may be deemed corresponding to having the clutch arrangement 1 in the propeller locked mode, although the spring element 82 and fork portion showed in FIG. 10 are not located in the propeller locked mode, for example due to temporary blocking of the fork portion 83 from being moved towards the corresponding engagement structure 9 at the present angular position of the propeller shaft 3.

Consequently, when the cylindrical sleeve 77 is in an axial position corresponding to the propeller locked mode and when the second engagement structure 8 is not in locking engagement with the corresponding engagement structure 9 the spring element 82 is in an axially more compressed state. Furthermore, when the cylindrical sleeve 77 is in an axial position corresponding to the propeller locked mode and when the second engagement structure 8 is in locking engagement with the corresponding engagement structure 9 the spring element 82 is in an axially less compressed state.

The clutch arrangement housing 4 showed in FIGS. 7-10 completely and sealingly encapsulates the clutch arrangement 1, the actuating arrangement 70 and the electrical machine 71. Lubrication fluid may be provided within the housing 4 for lubricating the moving parts within the housing 4. A lubrication fluid drain plug 41 is provided for enabling replacement of lubrication fluid. The housing is typically made of metal, such as steel, aluminium or the like. Alternatively, the housing may be made of plastic material.

FIGS. 11-32 schematically illustrate a further example embodiment of the actuating arrangement 70.

The transmission arrangement is includes a projection 90, for example in form of a cylindrical pin or the like, that is fastened to the rotational shaft 76 and protrudes beyond an exterior cylindrical surface 91 of the rotational shaft 76. The transmission arrangement further includes a helically shaped guide track 92, groove, channel, or the like provided in the cylindrical sleeve 77 of the shift fork 75. The projection 90 is configured to interact with the guide track 92, such that rotational motion of the rotational shaft 76 including the projection 90 results in axial motion of the cylindrical sleeve 77.

An opposite arrangement is of course alternatively possible. In such as case the projection 90 is fastened to the cylindrical sleeve 77 of the shift fork 75 and protrudes inwardly beyond an exterior cylindrical surface 91 of the rotational shaft 76, and a helically shaped guide track is then provided in the rotational shaft 76.

Figure 11:
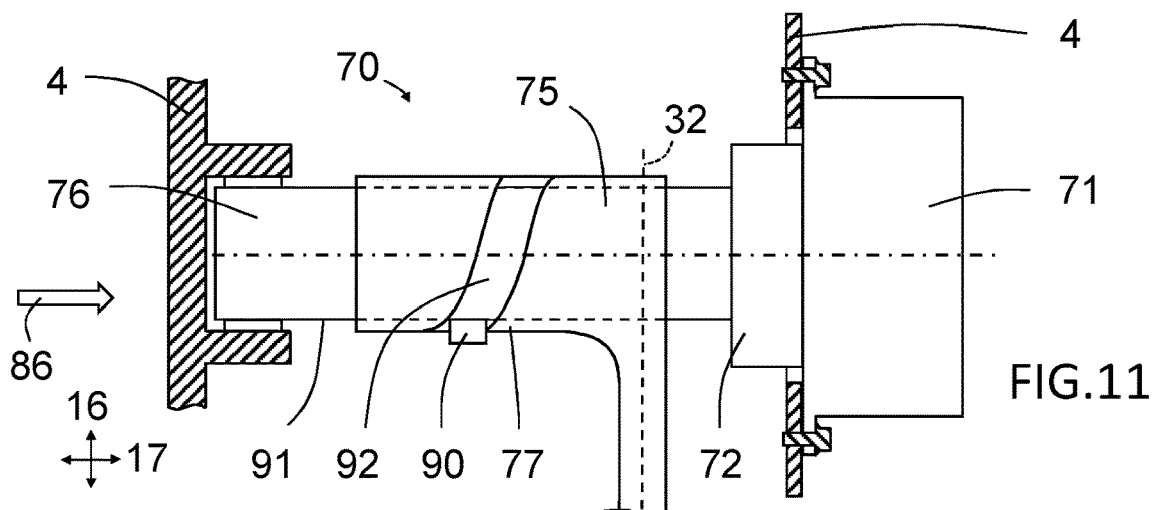
FIGS. 11-13 shows a further example embodiment of an actuating arrangement.

FIG. 11 shows the actuating arrangement 70 in the propeller locked mode, i.e. with the rotational shaft 76 located in a rotational position in which the projection is located at the lower end position of the helical guide track 92. This causes the fork portion 83 of the shift fork 75 to be located in the second axial position 32 due to the interaction of the projection 90 with the guide track 92. The second axial position 32 corresponds to the axial position of the fork portion 83 that is located furthest in the axial direction 86 towards the corresponding engagement structure 9 associated with the clutch arrangement housing 4.

Figure 12:
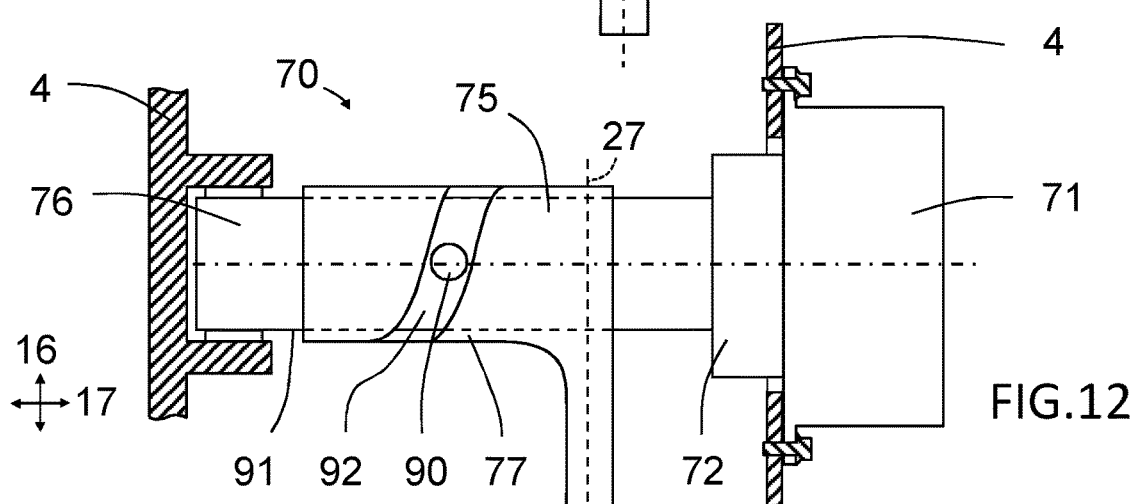

FIG. 12 shows the actuating arrangement 70 in the neutral mode, i.e. with the rotational shaft 76 located in a rotational position in which the projection is located halfway between the end positions helical guide track 92. This causes the fork portion 83 of the shift fork 75 to be located in the neutral position 27 due to the interaction of the projection 90 with the guide track 92.

Figure 13:
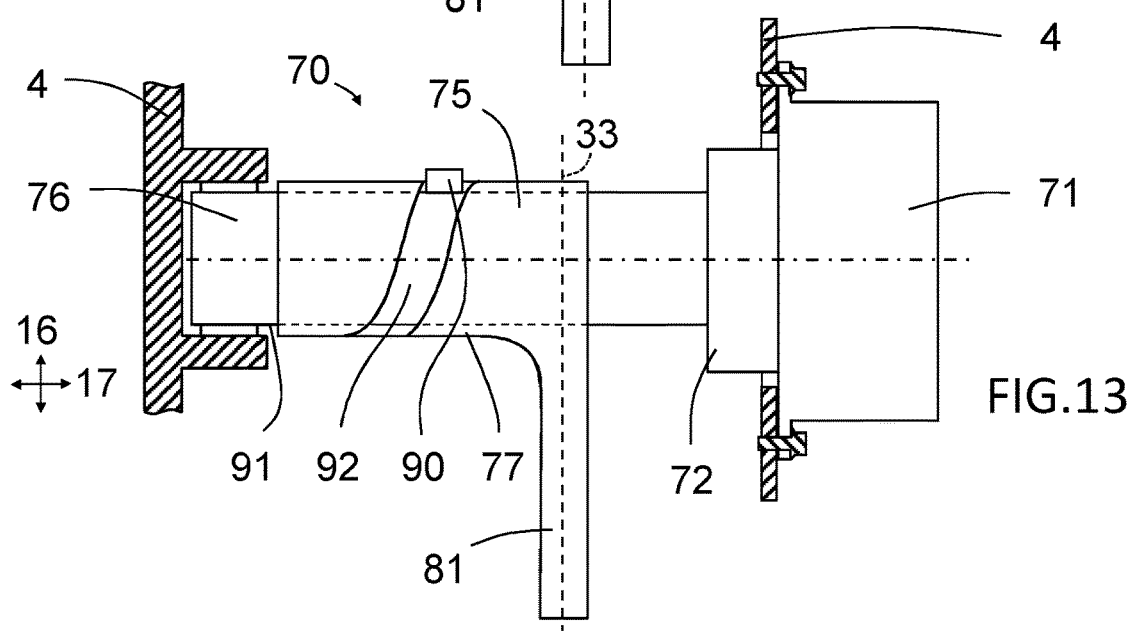

FIG. 13 shows the actuating arrangement 70 in the propeller propulsion mode, i.e. with the rotational shaft 76 located in a rotational position in which the projection is located at the upper end position of the helical guide track 92. This causes the fork portion 83 of the shift fork 75 to be located in the third axial position 33 due to the interaction of the projection 90 with the guide track 92.

Figure 14:
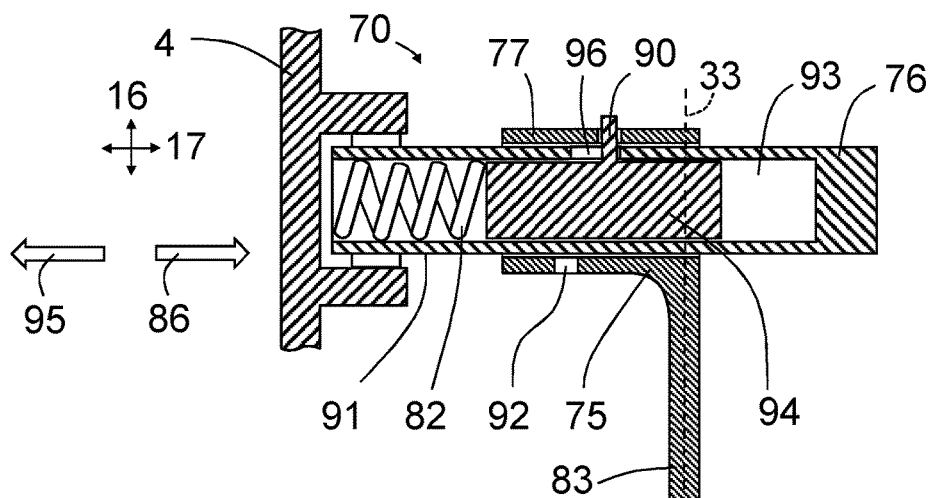
FIGS. 14-17 shows still a further example embodiment of an actuating arrangement.
Figure 15:
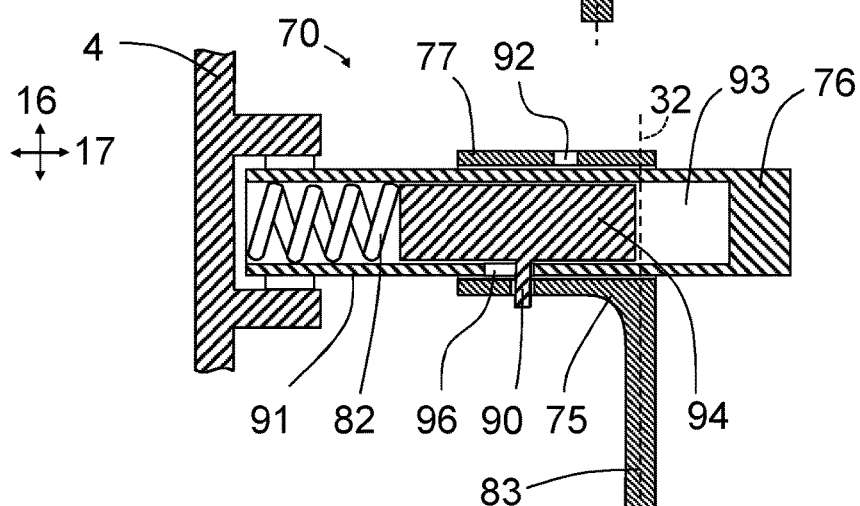
Figure 16:
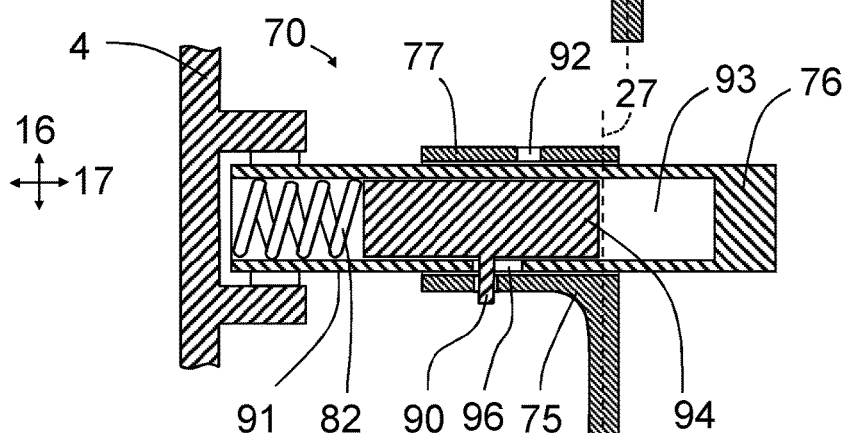

FIG. 14-16 schematically illustrate a further example embodiment of the actuating arrangement 70. This example embodiment is similar to the embodiment described with reference to FIGS. 11-13 but here with a actuating arrangement 70 that additionally includes a spring element 82 for enabling spring-loading of the second engagement structure 8 towards the corresponding engagement structure 9 associated with the clutch arrangement housing 4.

Figure 17:
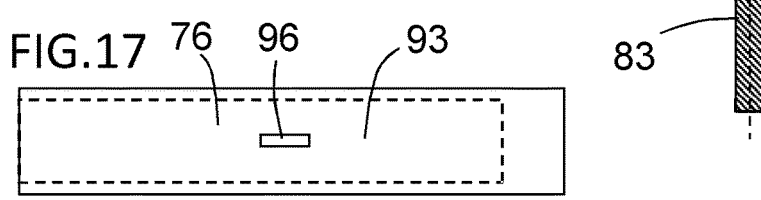

In detail, the rotational shaft 76 is hollow and defines an internal cylindrical cavity 93 in which a cylindrical spring-loaded body 94 is axially slidable. The rotational shaft 76 comprises an elongated opening 96 in the cylindrical wall, which opening extends primarily in the axial direction, as schematically shown in FIG. 17 which represents a side-view of the rotational shaft 76. The cylindrical spring-loaded body 94 comprises a projection 90 that is fastened to the cylindrical spring-loaded body 94 and that protrudes beyond an exterior cylindrical surface 91 of the rotational shaft 76.

A spring element 82 is located within the internal cylindrical cavity 93 and is configured to engage an axial side surface of the cylindrical spring-loaded body 94.

The transmission arrangement further includes a helically shaped guide track 92 provided in the cylindrical sleeve 77 of the shift fork 75, wherein the projection 90 is configured to interact with the guide track 92 for converting rotational motion of the rotational shaft 76 including the projection 90 into axial motion of the cylindrical sleeve 77.

FIG. 14 shows the actuating arrangement 70 in the propeller propulsion mode, i.e. with the rotational shaft 76 located in a rotational position in which the projection is located at the upper end position of the helical guide track 92. This causes the fork portion 83 of the shift fork 75 to be located in the third axial position 33 due to the interaction of the projection 90 with the guide track 92. The projection of the cylindrical spring-loaded body 94 is pressed in the axial direction 86 towards the corresponding engagement structure 9 associated with the clutch arrangement housing 4 in response to the counter-force exerted by the guide track 92 provided in the cylindrical sleeve 77 upon movement of the cylindrical sleeve in the direction 95 towards the corresponding engagement structure 7 associated with the engine shaft 2.

FIG. 15 shows the actuating arrangement 70 in the propeller locked mode, i.e. with the rotational shaft 76 located in a rotational position in which the projection 90 is located at the lower end position of the helical guide track 92. This causes the fork portion 83 of the shift fork 75 to be located in the second axial position 32 due to the interaction of the projection 90 with the guide track 92.

However, in case of temporary interference between the second engagement structure 8 and the corresponding engagement structure 9 at the present angular position when the fork portion 83 of the shift fork 75 is about to become displaced to the second axial position 32 due to the interaction of the projection 90 with the guide track 92, the fork portion 83 will remain in the neutral position 27 despite that the rotational shaft 76 becomes located in a rotational position in which the projection 90 is located at the lower end position of the helical guide track 92. This is possible due to the spring element 82 which becomes axially compressed, as showed in FIG. 16.

In the axially compressed state the spring element 82 exerts an urging force on the cylindrical spring-loaded body 94 and its projection 90 towards the corresponding engagement structure 9 associated with the clutch arrangement housing 4. As a result, as soon as the interference situation is eliminated, for example due to a certain angular displacement of the propeller shaft 3, the projection 90 will urge the shift fork 75 and the engagement member 5 to move towards the corresponding engagement structure 9, the spring element 82 will becomes less compressed, and the second engagement structure 8 will properly engage with the corresponding engagement structure 9.

Figure 18:
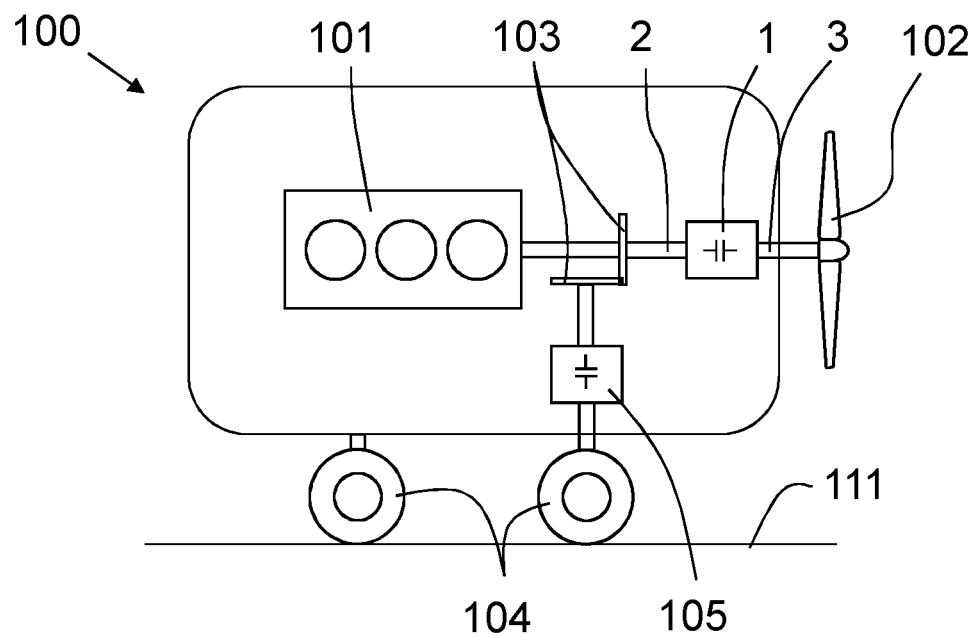
FIGS. 18-19 shows two alternative drive train layout embodiments of a roadable aircraft.

FIG. 18 shows a schematic illustration of an example embodiment of a drive train for a roadable aircraft 100 comprising a clutch arrangement 1 according to the disclosure. The roadable aircraft 100 comprises an engine 101, a combustion engine shaft 2, the clutch arrangement 1, a propeller shaft 3 and a propeller 102 fastened to the propeller shaft 3. The roadable aircraft 100 further comprises a power split, for example in form of angular bevel gears 103, for directing propulsion torque also to at least one driving wheel 104 of the roadable aircraft 100. An additional clutch 105 may be provided for enabling disconnection of propulsion torque to the driving wheels 104 in the flying mode. Similarly, the clutch arrangement 1 enables temporary disconnection of the propulsion torque to the propeller 102 in the road driving mode, which is intended for use when driving on roads 111. Moreover, the clutch arrangement 1 further enables setting the propeller in a propeller locked mode during said road driving mode.

Figure 19:
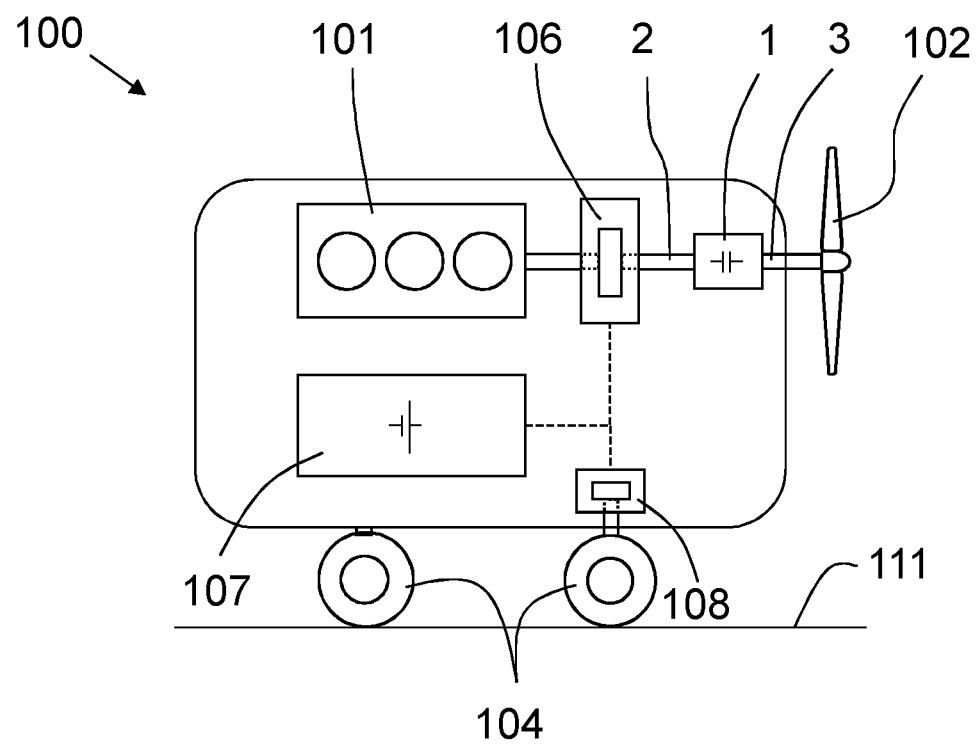

FIG. 19 shows a schematic illustration of a further example embodiment of a drive train of a roadable aircraft 100 comprising a clutch arrangement 1 according to the disclosure. The roadable aircraft additionally comprises a combustion engine 101 drivingly connected to the propeller 102 via the clutch arrangement 1, a first electrical machine 106 drivingly connected to the combustion engine 101 and drivingly connected to the propeller 102 via the clutch arrangement 1, an electrical battery 107 for storing electrical energy generated by the first electrical machine 106, at least one driving wheel 104 for driving the roadable aircraft on roads, a second electrical machine 108 drivingly connected to the at least one driving wheel 104, wherein the combustion engine 101 and the first electrical machine 102 are configured for driving the propeller 102 individually or jointly.

In the flying mode the clutch arrangement 1 is set in propeller propulsion mode and rotational propulsion torque from one or both of the combustion engine 101 and the first electrical machine 102 are conveyed via the engine shaft 2, clutch arrangement 1 and propeller shaft 3 to the propeller 102. The first electrical machine 102 uses electrical energy from the electrical battery 107 for generating propulsion torque to the propeller 102.

In the road driving mode the clutch arrangement 1 is set in propeller locked mode for preventing undesirable and uncontrolled spinning of the propeller in the road. The second electrical machine 108, which is drivingly connected to the at least one driving wheel 104, is used for driving the roadable aircraft. The second electrical machine 102 uses electrical energy from the electrical battery 107 for generating propulsion torque to the driving wheels 104. Moreover, the combustion engine 101 may be used for driving the first electrical machine 106 for generating electrical energy that can be stored in the electrical battery 107.

In certain embodiments, the first electrical machine be integrated into the housing 4 of the clutch arrangement 1 for providing a more compact design.

Although the disclosure has been described in relation to specific combinations of components, it should be readily appreciated that the components may be combined in other configurations as well which is clear for the skilled person when studying the present application. For example, the example embodiments of the clutch arrangement and actuating arrangement disclosed with reference to FIGS. 3-17 may alternatively be designed without a neutral mode, as described with reference to FIG. 1B. Thus, the above description of the example embodiments of the present disclosure and the accompanying drawings are to be

What is claimed is:

1. A roadable aircraft comprising a clutch arrangement and a propeller fastened to a propeller shaft, wherein the clutch arrangement is located between an engine and the propeller of a drivetrain of the roadable aircraft, the clutch arrangement comprising:
   an engine shaft,
   the propeller shaft,
   a stationary clutch arrangement housing,
   an engagement member which is rotationally locked to and axially slidable relative to propeller shaft,
   wherein the engagement member comprises a first engagement structure for engaging a corresponding engagement structure associated with the engine shaft for setting the clutch arrangement in a propeller propulsion mode, in which rotational propulsion torque can be transmitted from the engine shaft to the propeller shaft via the engagement member,
   wherein the engagement member comprises a second engagement structure for engaging a corresponding engagement structure associated with the clutch arrangement housing for setting the clutch arrangement in a propeller locked mode, in which the propeller shaft is rotationally locked to the clutch arrangement housing by means of the engagement member, and
   wherein the second engagement structure and the corresponding engagement structure associated with the clutch arrangement housing are configured such that rotational locking engagement of the second engagement structure with the corresponding engagement structure occur only in those relative rotational positions of the propeller that the result in maximal ground clearance of the propeller.

2. The roadable aircraft according to claim 1, wherein none of the first and second engagement structures are engaged with corresponding engagement structure associated with the engine shaft or clutch arrangement housing when the engagement member is positioned in a neutral position located axially between the corresponding engagement structure associated with the engine shaft or clutch arrangement housing.

3. The roadable aircraft according to claim 1, wherein the engagement member comprises a synchroniser arrangement which, upon axial movement of the engagement member in an axial direction towards the corresponding engagement structure associated with the clutch arrangement housing, is configured for reducing a rotational speed of the propeller shaft before the second engagement structure engages with corresponding engagement structure associated with the clutch arrangement housing.

4. The roadable aircraft according to claim 3, wherein the synchroniser arrangement comprises a friction surface that is configured to engage a corresponding friction surface associated with the clutch arrangement housing for reducing the rotational speed of the propeller shaft before the second engagement structure engages with corresponding engagement structure associated with the clutch arrangement housing.

5. The roadable aircraft according to claim 1, wherein the clutch arrangement further comprising an actuating arrangement for controlling the axial position of the engagement member, and wherein the actuating arrangement comprises an axially slidable shift fork that is coupled with the engagement member such that the actuating arrangement can to control the axial position of the engagement member.

6. The roadable aircraft according to claim 5, wherein the actuating arrangement comprises a spring element for enabling spring-loading of the second engagement structure towards the corresponding engagement structure associated with the clutch arrangement housing.

7. The roadable aircraft according to claim 5, wherein the shift fork comprises at least three separate and individual parts assembled into a single shift fork: a cylindrical sleeve, a fork portion that is axially moveable relative to the cylindrical sleeve and arranged to engage the engagement member, and an axial spring element that is engaged with an axial surface of the cylindrical sleeve on one side of the spring element and with an axial surface of the fork portion on the other side of the spring element, such that the spring element may become axially compressed and such that the fork portion may become spring-loaded towards the corresponding engagement structure associated with the clutch arrangement housing upon axial movement of the cylindrical sleeve in the axial direction towards the corresponding engagement structure associated with the clutch arrangement housing.

8. The roadable aircraft according to claim 7, wherein the spring element is located between an exterior cylindrical surface of the cylindrical sleeve and an interior cylindrical surface of the fork portion.

9. The roadable aircraft according to claim 5, wherein the actuating arrangement further comprises a rotatable shaft on which a cylindrical sleeve of the shift fork is located, and wherein rotation of the rotatable shaft is transmitted to axial motion of the cylindrical sleeve by means of a transmission arrangement.

10. The roadable aircraft according to claim 9, wherein the transmission arrangement comprises an external thread provided on the rotatable shaft and a mating internal thread provided on the cylindrical sleeve, such that rotation of the rotatable shaft is transmitted to axial motion of the cylindrical sleeve.

11. The roadable aircraft according to claim 9, wherein the clutch arrangement further comprises an electrical machine for driving the rotatable shaft.

12. The roadable aircraft according to claim 9, wherein the clutch arrangement further comprises a planetary transmission rotatably connected to an output shaft of the electrical machine and the rotatable shaft for operating as speed reduction unit between the electric machine and the rotatable shaft.

13. The roadable aircraft according to claim 1, wherein the second engagement structure comprises a plurality of protrusions, teeth, splines or claws, that can rotationally lock with corresponding protrusions, teeth, splines or claws of the corresponding engagement structure associated with the clutch arrangement housing only in certain rotational locking positions of the propeller shaft, and wherein the angular position of the propeller blades are matched to those certain rotational locking positions of the propeller shaft, such that the maximal ground clearance of the propeller blades is achieved in said rotational locking positions of the propeller shaft.

14. The roadable aircraft according to claim 1, wherein the roadable aircraft further comprising:
   a combustion engine drivingly connected to the engine shaft for driving the propeller via the clutch arrangement, a first electrical machine drivingly connected to the combustion engine and drivingly connected to the engine shaft for driving the propeller via the clutch arrangement,
an electrical battery for storing electrical energy generated by the first electrical machine,
at least one driving wheel for driving the roadable aircraft on roads,
a second electrical machine drivingly connected to the at least one driving wheel,
wherein the combustion engine and the first electrical machine are configured for driving the propeller individually or jointly.

\* \* \* \* \*